Nov. 7, 1961  T. J. WEIR  3,007,560
FLUID COUPLING MECHANISM
Filed May 31, 1957  3 Sheets-Sheet 1
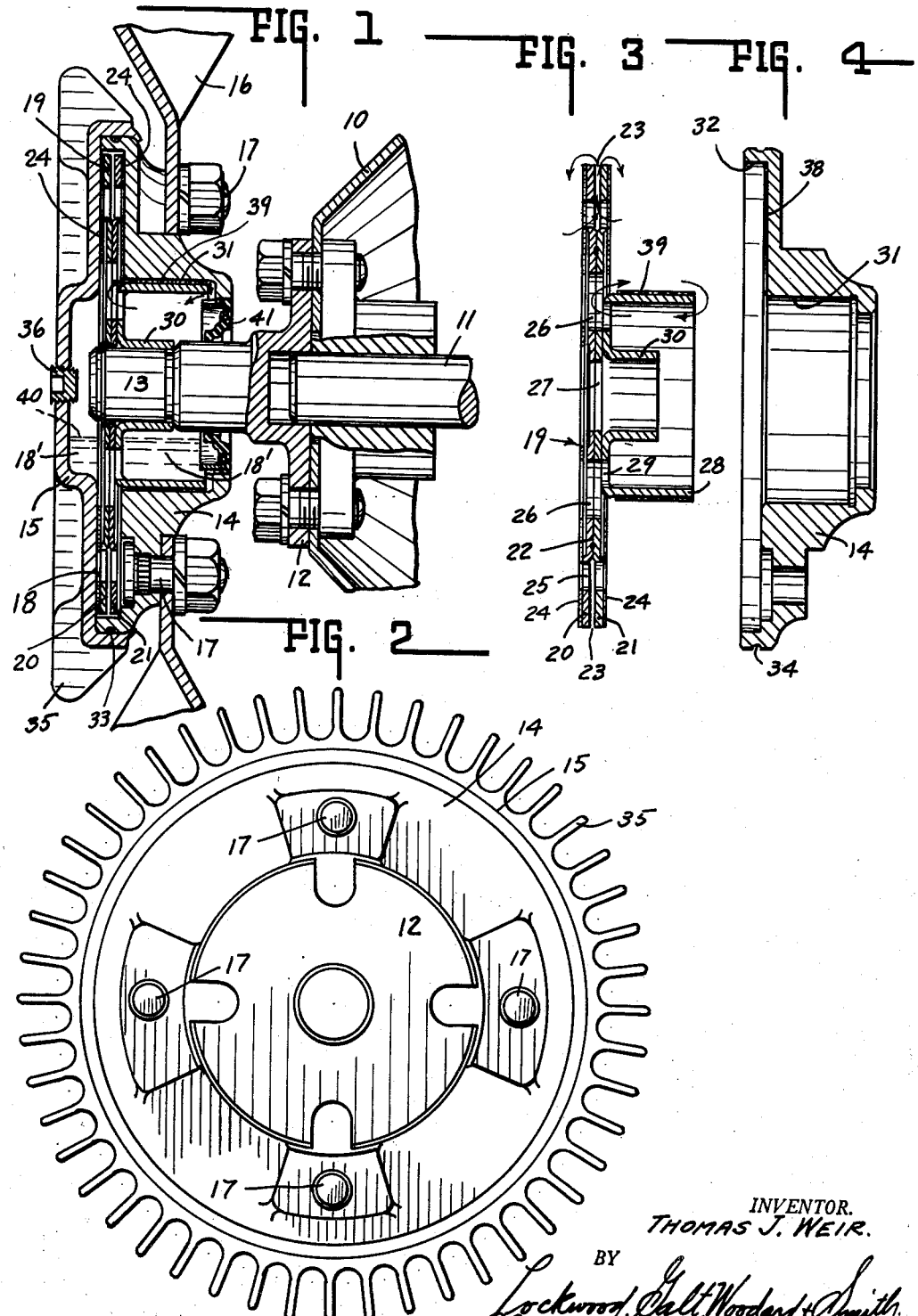
INVENTOR.
THOMAS J. WEIR.
BY
Lockwood, Galt, Woodard & Smith
ATTORNEYS.

Nov. 7, 1961 T. J. WEIR 3,007,560
FLUID COUPLING MECHANISM
Filed May 31, 1957 3 Sheets-Sheet 2
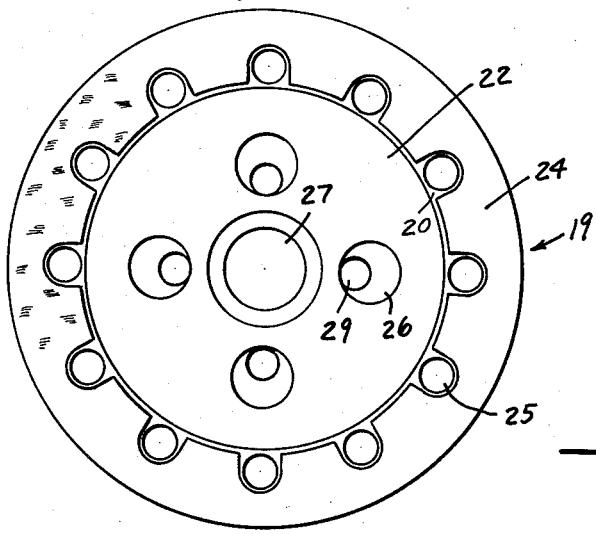
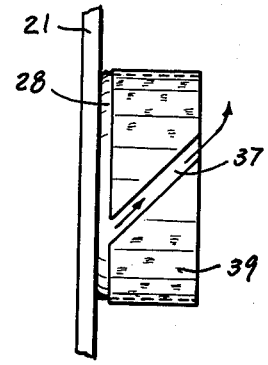
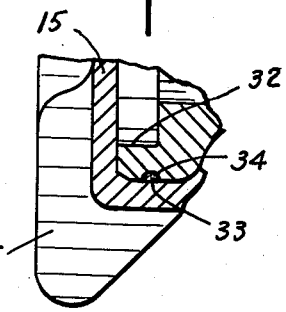
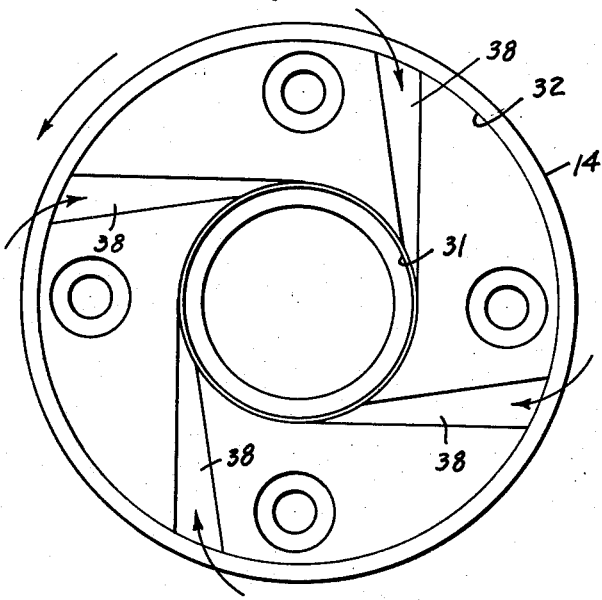
INVENTOR.
THOMAS J. WEIR.
BY
Lockwood, Galt, Woodard & Smith
ATTORNEYS.

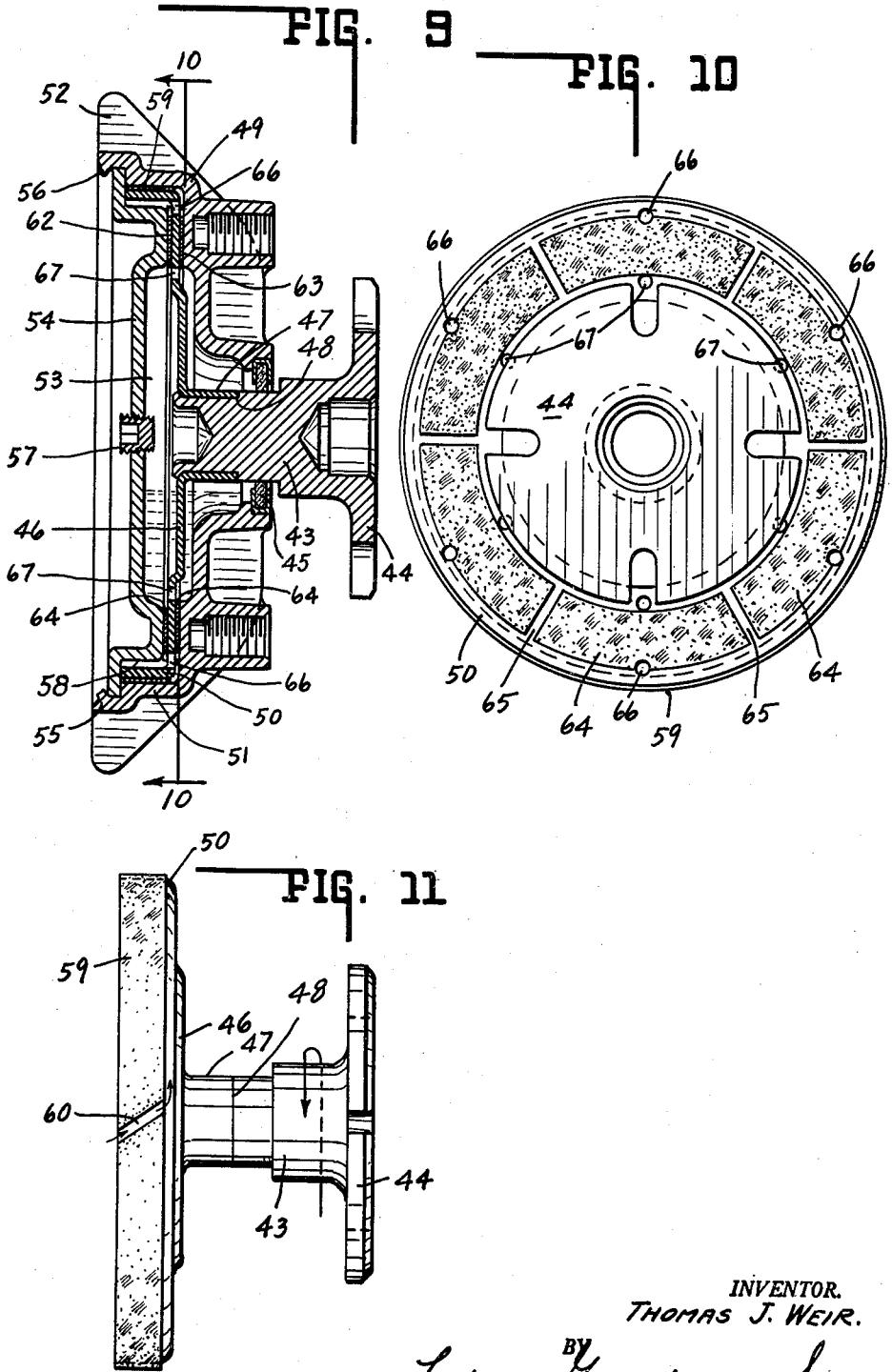

United States Patent Office 3,007,560
Patented Nov. 7, 1961

3,007,560
FLUID COUPLING MECHANISM
Thomas J. Weir, Indianapolis, Ind., assignor to Schwitzer Corporation, Indianapolis, Ind., a corporation of Indiana
Filed May 31, 1957, Ser. No. 662,802
15 Claims. (Cl. 192—58)

This invention relates to a fluid coupling for driving accessory devices such as are commonly associated with an internal combustion engine or any similar driving means or other power sources. Such accessory, for example, may include a radiator cooling fan, electric generator, air conditioner compressor or water pump.

Generally speaking, the power consumed by such accessories increases as the speed of the engine or driving means increases, but in many instances the demand for the useful output of such a driven accessory, beyond a certain maximum speed, increases, if at all, at a rate much less than that resulting from the increase in speed of the driving means or engine. A notable example of this condition is the radiator cooling fan. If such accessory is coupled directly to the engine, the power consumed thereby increases approximately as the cube of the engine speed, whereas the necessary speed for the fan, as an agency for inducing heat-exchanging air flow through the radiator, in most cases does not increase in proportion to the engine speed.

It is, therefore, the object of this invention to provide is an accessory-driving mechanism, a slippable coupling which will operate automatically with increased slippage as the driving or engine speed increases, thereby reducing the speed of, and the power consumed by the driven accessory.

Still a further object of the invention is to provide in an accessory drive a slippable coupling so designed and constructed as to facilitate the dissipation of heat generated as a result of the slippage.

In carrying out the invention, there is provided a fluid coupling of the shear type comprising a pair of relatively rotatable elements, one preferably in the form of a disc-like rotor and the other in the form of a casing or housing enclosing such rotor and having wall surfaces spaced therefrom to provide a chamber for a supply of fluid. One or both of the coupling elements may be provided with means capable of creating a toroidal circulation of the fluid during periods in which the two elements are operating at different speeds, such fluid circulation serving to promote the dissipation of heat generated by the friction resulting from the slippage.

If desired, the speed of the driven accessory may be effected automatically in response to the demand thereon. As such a device operates, any tendency toward increased speed of the accessory is reflected as an increase of the torque which must be applied thereto and transmitted through the fluid coupling, and such increased torque automatically effects an increase in slippage. Thus the speed of the driven element or accessory would increase at a lesser rate than the driving element or engine.

One feature of this invention resides in the provision of a plain bearing structure between the rotor and the housing which is more economical and develops greater torque than the usual frictionless bearings. This is effected by the searing of the fluid film providing bearing lubrication which also has toroidal circulation such as to carry away the fluid and dissipate heat by reason of the structure and arrangement hereinafter more fully set forth and described.

A further feature of the invention resides in the fluid reservoir provided in the bearing structure, and communicating passages and ports for creating the heat dissipating fluid circulation in conjunction with the rotor and its housing.

The full nature of the invention will be understood from the accompanying drawings and the following description and claims:

FIG. 1 is a section taken axially through a fluid coupling that may be adapted to the driving of an engine cooling fan;
FIG. 2 is a rear elevation of the housing therefor;
FIG. 3 is a section taken axially through the rotor;
FIG. 4 is a section taken axially through a section of the housing including the bearing for the rotor;
FIG. 5 is a front elevation of the rotor shown in FIG. 3;
FIG. 6 is a front elevation of the bearing section of the housing as shown in FIG. 4;
FIG. 7 is a view showing the periphery of the hub portion of the rotor shown in FIG. 3;
FIG. 8 is an enlarged section showing the peripheral portion of the housing section of FIG. 4;
FIG. 9 is a section taken axially through a modified fluid coupling;
FIG. 10 is a section taken on line 10—10 of FIG. 9; and
FIG. 11 is a side elevation of the rotor and spindle shown in FIG. 9.

In the drawing there is illustrated as one example of the invention a fluid coupling for driving an engine cooling fan, although said coupling may be similarly utilized for transmitting torque from a source of power to other driven accessories. The structure herein illustrated has to do particularly with the bearing structure of the rotor and housing including the toroidal circulation of fluid for lubrication, elimination of hot spots and dissipation of heat generated through the fluid friction. It also is illustrative of that feature of the invention relating to the bearing structure wherein the rotor rotates relative to the housing about a fluid film having a continuous heat dissipating toroidal circulation.

In this illustration, the driving or torque producing element includes the fan pulley 10 mounted on a driving shaft 11, said pulley being driven in the usual manner from the crank shaft of the engine. Secured to the face of the fan pulley by its flanged portion 12 there is a driving element or spindle 13 about which the fluid housing, comprising the cup-like section 14 and cover plate 15, is mounted for free rotation relative to a rotor. Driven elements, such for example as the radiator cooling fan blades 16, are secured to the housing section 14 through the studs 17 for rotating therewith.

The housing, including the section 14 and cover plate 15 encompasses a fluid chamber 18 which includes the reservoir portion 18' as hereinafter more particularly described. A rotor indicated at 19, and as shown in FIG. 3, is formed of two face-to-face rotor plates 20, 21. Said plates have their inner portions secured together in abutting relation by welding or other means as indicated at 22, their outer peripheral portions being slightly spaced apart to provide an annular fluid passage 23 therebetween. The opposite sides of said plates are preferably provided with a lining or facing of cork or a like friction material as indicated at 24. Said plates are also provided with an annular series of apertures 25 communicating with fluid passage 23. The inner portions of said plates also have an annular series of enlarged apertures 26 and a centrally disposed spindle receiving opening 27.

Said plates are secured together throughout their inner portions 22 so as to comprise a unitary rotor. The rotor is in turn secured to a hub portion 28 of cup-like form having an annular series of ports 29 and registering with the apertures 26. Said cup-like hub is formed with an inturned thimble portion 30 for receiving the end of the spindle 13 and interlocking the rotor therewith. Thus the driven shaft 11 and spindle 13 positively drive the rotor 19. The bearing section 14 of the housing, as shown in FIG. 4, is formed with a cup-like bearing recess 31 surrounding and having its bearing upon the hub 28, the face of said section being recessed at 32 for receiving the rotor plates. Upon the bearing section 14 of the housing being assembled with the rotor to embrace the hub and plates as shown in FIG. 1, the cover plate 15 is secured about the periphery of said section and swaged thereover with a sealing compound 33 seated about the peripheral groove 34.

The cover plate 15 of the housing is formed with an annular series of radially extending fins 35 for heat radiation and dissipation, the central portion of said plate being cupped to provide a fluid reservoir 18' in which fluid may be introduced through a screw plug 36.

The hub 28 of the rotor is preferably provided with a peripheral facing 39 of cork, brake lining material, or other non-metallic materials having similar structural and frictional characteristics, FIGS. 3 and 7. The peripheral facing 39 may be formed to provide a fluid passage groove 37 as shown in FIG. 7 extending obliquely over the outer surface thereof at an angle to its axis for directing the flow of fluid from the cup portion nearest to the rotor plate to the opposite end thereof. Also the inner face of the housing section 14 is provided with an annular series of tangential grooves 38 narrowing from the outer periphery of housing section 14 to the inner periphery thereof as shown in FIG. 6.

It will be readily understood by those skilled in the art that the facing material 39 may be formed with no fluid passage groove and a similar groove may be formed in the adjacent surface of housing 14 except that such a groove would be disposed at an angle opposite to that of groove 37. Also the inner face of housing section 14 may be smooth and grooves similar to grooves 38 may be formed in the facing 24. In such a case, the grooves would be tangential to surface 31 but directed in the opposite direction to that of grooves 38.

Experimental development of this invention reveals that silicone oils of the type discussed in the General Electric Review, volume 49, No. 11, of November 1946, pages 14 to 18, "Silicone Oils, Properties and Applications," by Dr. Donald F. Wilcock, are preferable for use in the apparatus described herein. Silicone oils or other types of oil which maintain to maximum degree their viscosity at higher temperatures, provide the maximum transmission of torque as well as maximum lubrication and dissipation of heat. Linings or facings 24 and 39 of the specified types of material have been found to operate the most efficiently as bearing materials in cooperation with silicone oils. Experiment shows that silicone oil in a coupling of this type is not a good lubricant where certain types of metallic bearing materials are used. This is due to the fact that localized high temperature is caused at various spots on the bearing surfaces, probably because of irregularities in the mating surfaces which tend to break down a lubricating fluid. Materials such as those mentioned have fluid retaining ability or "pocketing" effect which provides a reduced resultant coefficient of friction even though the separating oil film is not maintained between the bearing surfaces. Less heat is generated at the rubbing surfaces of the bearing and the temperature of any localized hot spots is lowered whereby fluid life is extended to a substantial extent.

Other forms of bearing materials which have been found applicable in this invention are compounded thermosetting resins of the phenol-formaldehyde class. This type of material has sufficient resilience to yield to any irregularities on the mating surface without being penetrated or otherwise deformed.

In operation, a suitable high viscosity fluid having frictional shearing and lubricating characteristics is introduced into the reservoir 18' and chamber 18 through the plug 36 until it is normally at a level indicated by the dotted line 40 (FIG. 1), being retained therein by the flexible seal 41 (FIG. 1). Upon the rotor being driven by spindle 13 and rotating relative to the housing, the fluid will be distributed throughout chamber 18 and over and around the bearing. Torque will be transmitted from the driving spindle 13 to the housing section 14 and fan blades 16 through the shearing action of the fluid which occurs between the mutually facing surfaces of linings 24 and the housing. Additional torque is transmitted through the shearing action of the fluid between the mutually facing surfaces of lining 39 and bearing recess 31. A toroidal circulation of the fluid will take place to circulate, in a clockwise direction, about the inner and outer peripheral surfaces of the hub 28 as indicated by the arrows in FIGS. 1 and 3, passing through the apertures 26 and 29 of the plates and about the opposite end of the hub. Thus there will be provided a viscous fluid film over the bearing surface of the hub to give the rotor full lubricated freedom of relative rotation while dissipating heat resulting therefrom due to the toroidal circulation. At the same time, the lining or facing 39 prevents metal-to-metal contact and wear and any danger of freezing within the bearing recess of the housing.

By reason of the annular series of apertures 25 in the rotor plates, there will be a toroidal circulation about the periphery of the rotor as indicated by the arrows in FIG. 3, such toroidal circulation cooperating with the first-mentioned toroidal circulation about the hub to transmit heat to the housing for dissipation through radiation by the fins 35. The interior of the hub, being in communication with the fluid chamber 18 through the apertures 26, 29, additionally provides an enlarged reservoir 18' for containing the fluid.

As shown in FIG. 7, with the relative rotation of the rotor being clockwise as viewed from the left hand side thereof, the fluid will be wiped and forced through the groove 37 from the rotor to the other side of the hub to generate or further facilitate the toroidal circulation, as indicated by the arrows in FIG. 7. Additionally, the grooves 38 (FIG. 6) provided in the inner face of the housing section 14 will cause the fluid between said section and the rotor to be wiped and directed inwardly from the toroidal circulation about the periphery of the rotor back to the bearing periphery of the drum as indicated by the arrows in FIG. 6. This is due to slower rotation of the housing section 14 in the direction of the arrow of FIG. 6 counterclockwise relative to the rotor during their relative rotation.

The fluid in the tangential grooves 38 will also develop pressure in the axial direction that tends to separate the housing 14 from the rotor 19 which, in the case of a driven accessory with axial thrust, for example a fan, will counteract the said thrust.

The grooves 38 can be provided either in the cover portion 15 of the housing or the hub portion 14 as shown in FIG. 6 as required, depending on the direction of thrust produced by the driven accessory.

If the direction of input rotation is opposite, the groovings must be in the reversed direction to that illustrated herein.

From the above description of the invention as shown herein, a simplified and economical bearing as distinguished from an anti-friction bearing, is provided which has the characteristics of forced lubrication, toroidal circulation, heat dissipation and viscous fluid shearing action. Additionally the bearing structure provides a reservoir for the fluid having communication with the fluid chamber in which the rotor operates, and serves through the grooves 38 and ports 29 to inter-relate the toroidal heat dissipating action of the fluid about the hub and its bearing surface with the toroidal circulation about the periphery of the rotor to transfer heat through the housing to the radiating fins 35 for dissipation of heat into the surrounding air.

A modification of this invention is illustrated in FIGS. 9, 10 and 11. As in the case of the previously described embodiment of the invention, a driving or torque producing means such as the fan pulley 10 may be connected to drive a driving element or spindle 43 through connection thereof through flanged portion 44. A rotor 46 may be mounted on spindle 43 by means of a spindle receiving hub 47, the outer end of spindle 43 being swaged over the rotor end of the hub to clamp the other end of the hub against shoulder 48 of spindle 43. A fan supporting housing 49 is supported by rotor 46 by means of a cylindrical bearing portion 50 of the rotor which is disposed within a cylindrical cup-like recess formed by the outer flange portion 51 of housing 49. Housing 49 is provided with heat dissipating fins 52. A fluid containing chamber 53 is formed by housing 49 and a cover plate 54 fitted within the outer lip portion 55 of housing 49 and secured thereto by swaging the inner periphery of lip 55 over the outer periphery of cover 54 as shown at 56. Cover plate 54 may be provided with a filler plug 57 which may be removed for filling chamber 53 to a desired level with a fluid such as silicone oil. A conventional seal 45 may be provided between spindle 43 and housing 49 as shown in FIG. 9.

The outer surface of the cylindrical bearing portion 50 is faced or lined with a relatively thin sheet 59 of cork, brake lining material, or other non-metallic materials having similar characteristics, as shown in FIGS. 9 and 11, and as previously described. Cover 54 is formed at 58 to provide a fluid reservoir within cylindrical bearing member 50. The lining or facing 59 may be slotted to provide a fluid passage groove 60 (FIG. 11), which functions in a manner similar to the groove 37, in FIG. 7, to provide a toroidal flow of fluid on and about the mating bearing surfaces of the lining and the flange 51.

The cover plate 54 is formed to provide an annular, internal bearing surface 62 and the housing 49 is provided with a similar annular bearing surface 63 facing the surface 62. The outer portion of the rotor 46 extends between bearing surfaces 62 and 63 and its surfaces, facing surfaces 62 and 63, are provided with a segmented lining or facing consisting of the segments 64 of the previously described materials such as cork, brake lining material, or the like. The segments 64 are spaced with respect to one another to provide the fluid passage grooves 65 (FIG. 10). As in the case of grooves 38, the fluid in grooves 65 will develop pressure in an axial direction tending to separate the housing and the rotor, whereby thrust of an accessory such as a fan is counteracted. Flow of fluid in and around the bearing surfaces is further enhanced by providing the passage holes 66 and 67 on opposite sides of the lining segments 64.

In operation, rotor 46 may be driven from spindle 43 whereby there is rotation of the rotor relative to the housing 49. The shearing action of the fluid between the mutually facing surfaces of linings 64 and the housing and between the mutually facing surfaces of lining 59 and member 51 produces transmission of torque from the rotor to the housing, thereby driving the housing and the fan attached thereto. It should be noted that the bearing portion 59 of the rotor provides additional driving torque. As in the originally described embodiment of the invention, a toroidal circulation of fluid will take place through the fluid passage groove 60, the fluid passage grooves 65 and the apertures 66 and 67. Thus there is a viscous fluid film over the bearing surfaces of members 50 and 51 and also of cover plate 54, housing 63 and the linings 59 and 64, and the fluid is circulated throughout the interior of the housing 49 thereby to transfer heat to the housing and the radiating fins 52.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In a fluid coupling, the combination comprising a fluid retaining housing having spaced faces defining opposite sides of a chamber for containing a supply of fluid, a rotor disposed for rotation in said chamber relative to said housing with its side surfaces extending in face-to-face relation with the faces of said housing, and means for imparting relative rotation to said rotor and said housing whereby torque will be transmitted between said rotor and said housing through the shearing action of the fluid, one face of said housing including a cylindrical bearing, and a cylindrical hub extending from said rotor into operative relation with said bearing and mounting said housing in operative relation to said rotor, said hub providing therein a fluid reservoir communicating with said chamber, said hub including means forming a toroidal fluid path which includes the inner and outer surfaces and the ends of said hub to effect a toroidal circulation of fluid over and about the bearing surfaces of said hub and housing for lubrication and heat dissipation, said rotor being provided with a series of apertures adjacent the periphery of said hub communicating with the toroidal circulation of fluid about the bearing surfaces for heat transfer to said housing.

2. The invention as defined in claim 1 wherein one of the spaced faces of said housing is formed to provide an annular series of tangential grooves for causing fluid to be wiped and directed inwardly from the periphery of the rotor toward the hub of the rotor to form a thrust bearing film of fluid on said one face of said housing.

3. In a fluid coupling, the combination comprising a fluid retaining housing having spaced faces defining opposite sides of a chamber for containing a supply of fluid, a rotor disposed for rotation in said chamber relative to said housing with its side surfaces extending in face-to-face relation with the faces of said housing, means for imparting relative rotation to said rotor and said housing whereby torque will be transmitted between said rotor and said housing through the shearing action of the fluid, one face of said housing including a cylindrical recess providing a bearing surface and a cylindrical hub extending from said rotor into operative relation with said bearing surface and mounting said housing in operative relation to said rotor, said hub providing therein a fluid reservoir communicating with said chamber through a series of apertures in said rotor, said hub including means forming a toroidal fluid path which includes the inner and outer surfaces and the ends of said hub to effect lubrication and a toroidal circulation of fluid over and about the bearing surfaces of said hub and housing for heat dissipation, said rotor being provided with a series of apertures adjacent the periphery thereof communicating with the toroidal circulation of fluid about the bearing surfaces for heat transfer to the outer peripheral portion of said housing.

4. In a fluid coupling, the combination of a driving element and a driven element, a fluid retaining housing connected with one of said elements having spaced faces defining opposite sides of a chamber for containing a supply of fluid, a rotor disposed for rotation in said chamber relative to said housing with its side surfaces extending in face-to-face relation with the faces of said housing, means for connecting said rotor with the other said element whereby torque will be transmitted through the shearing action of the fluid from one of said elements to the other, one face of said housing including a cylindrical recess providing an outer bearing surface, a cylindrical hub extending from said rotor into said bearing recess and mounting the rotor in said housing for rotation relative thereto, and means forming a toroidal fluid path which includes a lining on said hub to provide an outer bearing surface, the inner surface of said hub, the ends of said hub, and an angular groove formed in one of said bearing surfaces in communication at opposite ends with said recess to effect a toroidal circulation of fluid therethrough and over and about said bearing surfaces for heat transfer to said housing, said rotor being provided with a series of apertures adjacent said hub communicating with the toroidal circulation of fluid about the bearing surfaces for heat transfer to said housing.

5. In a fluid coupling, the combination of a driving element and a driven element, a fluid retaining housing connected with one of said elements and having spaced faces defining opposite sides of a chamber for containing a supply of fluid, a rotor disposed for rotation in said chamber relative to said housing with its side surfaces extending in face-to-face relation with the faces of said housing, means for connecting said rotor with the other of said elements whereby torque will be transmitted through the shearing action of the fluid from one of said elements to the other, one face of said housing being formed with a peripheral cylindrical recess having surfaces providing a bearing, a peripheral annular bearing member having surfaces extending from said rotor into said recess and operative relation with said bearing for mounting said housing in operative association with said rotor, the peripheral portion of said housing providing a fluid reservoir communicating with said chamber, means to effect a toroidal circulation of fluid over and about the bearing surfaces of said member and housing for heat dissipation, said rotor being provided with a series of apertures adjacent the periphery thereof communicating with the toroidal circulation of fluid about the bearing surfaces for heat transfer to said housing.

6. The invention as defined in claim 5 wherein one of the side surfaces of said rotor is formed to provide grooves extending radially inward from the rotor periphery for causing fluid to be wiped and directed inwardly from the periphery of the rotor toward its axis to form a thrust bearing film of fluid on said one side surface of said rotor.

7. The invention as defined in claim 5 wherein passages are provided between a side surface of said rotor and one of the spaced faces of said housing, said passages extending inwardly of the rotor periphery for causing fluid to be wiped on said surface and said face to form a thrust bearing film of fluid between said surface and said face.

8. In a fluid coupling, the combination of a driving element and a driven element, a fluid retaining housing connected with one of said elements and having spaced faces defining opposite sides of a chamber for containing a supply of fluid, a rotor disposed for rotation in said chamber relative to said housing with its side surfaces extending in face-to-face relation with the faces of said housing, means for connecting said rotor with the other of said elements whereby torque will be transmitted through the shearing action of the fluid from one of said elements to the other, one face of said housing being formed with a peripheral cylindrical recess providing an outer bearing surface, and a peripheral annular bearing member extending from said rotor into said recessed and operative relation with said bearing surface for mounting said housing in operative association with said rotor for rotation relative thereto, said peripheral bearing member having a lining of friction material extending thereabout to provide an outer bearing surface, one of said bearing surfaces being formed with an angular groove in communication at opposite ends with said recess to effect a toroidal circulation of fluid therethrough and over and about said bearing surfaces for heat transfer to said housing.

9. In a fluid coupling, the combination of a driving element and a driven element, a fluid retaining housing connected with one of said elements and having spaced faces defining opposite sides of a chamber for containing a supply of fluid, a rotor disposed for rotation in said chamber relative to said housing with its side surfaces extending in face-to-face relation with the faces of said housing, means for connecting said rotor with the other of said elements whereby torque will be transmitted through the shearing action of the fluid from one of said elements to the other, one face of said housing being formed with a peripheral cylindrical recess providing an inner bearing surface, a peripheral annular bearing member extending from said rotor into operative relation with said bearing surface for mounting said housing in operative association with said rotor for rotation relative thereto, said peripheral cylindrical recess providing a fluid reservoir, a series of apertures in said rotor registering with said reservoir, a friction lining surrounding said bearing member to provide an outer bearing surface cooperating with said inner bearing surface, a fluid passage formed in and extending transversely of one of said bearing surfaces communicating at opposite ends with said fluid reservoir to effect a toroidal circulation of fluid over and about said bearing surfaces and through said apertures for heat dissipation, and a fluid passage extending between adjacent portions of said rotor and said housing and interconnecting said peripheral recess with said chamber for conducting fluid from said chamber to provide toroidal circulation of fluid about the periphery of said rotor for heat transfer to said housing.

10. In a fluid coupling, the combination of a driving element and a driven element, a fluid retaining housing connected with one of said elements and having spaced faces defining opposite sides of a chamber for containing a supply of fluid, a rotor disposed for rotation in said chamber relative to said housing with its side surfaces extending in face-to-face relation with the faces of said housing, means for connecting said rotor with the other of said elements whereby torque will be transmitted through the shearing action of the fluid from one of said elements to the other, one face of said housing being formed with a peripheral cylindrical recess providing an outer bearing surface, and a peripheral annular bearing member having surfaces extending from said rotor into said recess and operative relation with said bearing surface for mounting said housing in operative association with said rotor for rotation relative thereto, said peripheral bearing member transmitting torque from said rotor to said driving element through the shearing action of the fluid between said outer bearing surface and the surface of said peripheral bearing member.

11. In a fluid coupling, the combination comprising a fluid retaining housing having spaced faces defining opposite sides of a chamber for containing a supply of fluid, a rotor disposed for rotation in said chamber relative to said housing with its side surfaces extending in face-to-face relation with the faces of said housing, and means for imparting relative rotation to said rotor and said housing whereby torque will be transmitted between said rotor and said housing through the shearing action of the fluid, one face of said housing including a cylindrical bearing, said rotor including a cylindrical member extending into operative relation with said bearing and mounting said housing in operative relation to said rotor, said cylindrical member providing therein a fluid reservoir communicating with said chamber, said member including means forming a toroidal fluid path which includes the inner and outer surfaces and the ends of said cylindrical member to effect a toroidal circulation of fluid over and about the bearing surfaces of said cylindrical member and said housing for lubrication and heat dissipation, said rotor being provided with a series of apertures adjacent said cylindrical member communicating with the toroidal circulation of fluid about the bearing surfaces for heat transfer to said housing.

12. The invention as defined in claim 11 wherein linings of thermosetting material are fixed to the side surfaces of said rotor and to the exterior surface of said cylindrical member.

13. The invention as defined in claim 11 wherein said cylindrical member has a lining fixed to its exterior surface, said lining comprising a relatively porous material as compared with metallic materials to provide pockets of fluid on the bearing surface of said hub.

14. The invention as defined in claim 11 wherein a thermosetting lining is fixed to one of said bearing surfaces.

15. The invention as defined in claim 11 wherein one of the spaced faces of said housing is formed to provide an annular series of tangential grooves causing fluid to be wiped and directed inwardly from the periphery of the rotor toward its axis of rotation to form a thrust bearing film of fluid on said one face of said housing.

References Cited in the file of this patent

UNITED STATES PATENTS

| | | |
|---|---|---|
| 125,388 | Grosvenor | Apr. 9, 1872 |
| 603,291 | Snyder | May 3, 1898 |
| 2,046,723 | Brownscombe | July 7, 1936 |
| 2,472,925 | Spase | June 14, 1949 |
| 2,629,472 | Sterner | Feb. 24, 1953 |
| 2,680,410 | Kolb | June 8, 1954 |
| 2,717,678 | Ranzi | Sept. 13, 1955 |
| 2,772,930 | Schubert et al. | Dec. 4, 1956 |
| 2,792,095 | Sherman | May 14, 1957 |
| 2,812,648 | Croset | Nov. 12, 1957 |

FOREIGN PATENTS

| | | |
|---|---|---|
| 539,751 | France | Apr. 6, 1922 |